United States Patent [19]

Mar

[11] Patent Number: 5,549,794
[45] Date of Patent: Aug. 27, 1996

[54] CONTINUOUS LINEAR-TOROIDAL EXTRACTION-DISTILLATION APPARATUS

[75] Inventor: Michael W. Mar, Seattle, Wash.

[73] Assignee: H-O-H Research Inc., Seattle, Wash.

[21] Appl. No.: 248,364

[22] Filed: May 24, 1994

[51] Int. Cl.$^6$ .............................. B01D 3/00; B01D 11/00
[52] U.S. Cl. ................... 202/169; 202/168; 202/170; 202/185.1; 202/197; 202/202; 203/43; 203/49; 203/98; 203/DIG. 16
[58] Field of Search ................................ 202/168, 169, 202/170, 182, 185.1, 197, 205, 202–203, 237, 258, 270; 203/49, DIG. 16, 43–46; 159/16.1, 4.01; 422/255

[56] References Cited

U.S. PATENT DOCUMENTS

| | | | |
|---|---|---|---|
| 4,006,062 | 2/1977 | Bhuchar et al. | 202/169 |
| 4,255,386 | 3/1981 | Schachta et al. | 202/169 |
| 4,257,945 | 3/1981 | Martel | 202/169 |
| 4,567,020 | 1/1986 | Cognet et al. | 202/169 |
| 5,045,176 | 9/1991 | Walters et al. | 208/113 |
| 5,318,609 | 6/1994 | Kittler | 55/443 |

FOREIGN PATENT DOCUMENTS

| | | | |
|---|---|---|---|
| 0076789 | 6/1918 | Austria | 202/168 |
| 0049676 | 4/1982 | European Pat. Off. | |
| 1742308 | 6/1992 | Russian Federation | |
| 1019203 | 5/1983 | U.S.S.R. | |
| 1180039 | 9/1985 | U.S.S.R. | |

Primary Examiner—Virginia Manoharan
Attorney, Agent, or Firm—Christensen O'Connor Johnson & Kindness PLLC; Johnson & Kindness PLLC

[57] ABSTRACT

An apparatus (10) for continuously extracting a solute from a carrier medium (102) is provided. The apparatus is formed from a vessel (12) including a convergent baffle (22) separating the vessel into a lower distillation chamber (24) and an upper extraction chamber (26). The convergent baffle is configured as an inverted funnel such that it defines a conduit riser (28) projecting upwardly into the extraction chamber and terminating in a vaporized solvent port (30) placing the distillation chamber in fluid-flow direct communication with the extraction chamber. A vapor rotating spheres-condenser (34) is mounted on the upper end of the vessel and opens into the extraction chamber. Solvent is placed in the distillation chamber while the carrier medium containing the solute is placed in the extraction chamber. Solvent is vaporized in the distillation chamber, rises upwardly through the conduit riser, and passes through the carrier medium, thereby extracting solute in a continuous linear-toroidal motion. The vapor then is condensed either into the extraction chamber or by the condenser and falls back downwardly into the carrier medium flowing through the carrier medium while extracting solute. The condensed solvent then returns to the distillation chamber via valves (35) for continuity of solvent supply. The continuous flow of vaporized solvent from the conduit riser induces a linear-toroidal flow about the conduit riser in the carrier medium that enhances the speed and efficiency of extraction.

12 Claims, 5 Drawing Sheets

5,549,794

CONTINUOUS LINEAR-TOROIDAL EXTRACTION-DISTILLATION APPARATUS

FIELD OF THE INVENTION

The present invention relates to apparatus and methods for continuously extracting a solute from a carrier medium by continuous direct contact with a solvent, and more particularly to liquid—liquid and solid-liquid extraction.

BACKGROUND OF THE INVENTION

Many technologies require the removal of a solute from a liquid or solid medium for the purposes of purifying the carrier medium or concentrating the solute for recovery or analysis. Concentration of the solute is carried out by intimately exposing the carrier medium to a solvent, which may be either liquid or gas but which is most frequently liquid. When the carrier is a solid and the solvent is a liquid, the process is referred to as solid-liquid extraction. Likewise, when the carrier medium is a liquid, the process is referred to liquid—liquid extraction.

Conventional methods of liquid—liquid extraction involve mixing a first liquid phase, consisting of a feed liquid contaminated with a solute, with a second liquid phase, consisting of a solvent. The first and second liquid phases are immiscible and selected to have a density and polarity difference to enable separation of the two liquid phases after contact. The process yields an "extract", i.e., the solvent and extracted solute, and a "raffinate", i.e., the treated liquid feed having a reduced concentration of solute.

Conventional methods of liquid—liquid extraction can be carried out on a continuous or batchwise basis. One established technique for contacting the two liquid phases involves counter current flow of the second liquid phase through the first liquid phase, or vice versa. The solvent stream passes through the feed stream in a single pass, but may thereafter be recycled for additional passes. Contact between the feed liquid and the solvent during each pass in such a "linear" operation is relatively low. Alternately, the two liquid phases can be more intimately contacted by mechanically agitating a vessel containing the two liquid phases. While such a method offers improved contact, it is limited in applicability due to the requirement for mechanical agitation, and can only be carried out on a batchwise basis.

SUMMARY OF THE INVENTION

The present invention provides a new method and apparatus for continuous extraction of a solute from a carrier medium using a volatile solvent. The apparatus consists of a vessel having a lower end and an upper end. A convergent baffle is positioned in the vessel between the lower end and the upper end, thereby separating the vessel into a distillation chamber below the baffle for containing a volatile solvent, and an extraction chamber above the baffle for containing the carrier medium. The convergent baffle is configured as an inverted funnel defining a conduit riser that acts as a convergent nozzle projecting upwardly into the extraction chamber and terminating in a vaporized solvent port. The vaporized solvent port places the distillation chamber in direct fluid flow communication with the extraction chamber. A vapor condenser is mounted on the upper end of the extraction chamber. A vapor condenser is mounted on the upper end of the vessel and is in fluid flow communication with the extraction chamber. The apparatus further provides for all condensed solvent to return from the extraction chamber and the condenser to the distillation chamber for continuity. The conduit riser continuously supplies a refreshed stream of solvent.

In a further aspect of the present invention, a method is provided for continuously extracting a solute from a carrier medium using such a continuous extraction apparatus constructed in accordance with the present invention. A volatile solvent is placed in the lower distillation chamber of the vessel, while the carrier medium containing the solute to be extracted is placed in the extraction chamber. Solvent is then vaporized in the distillation chamber, thereby causing solvent vapor to rise through the conduit riser, exiting the vaporized solvent port and flowing through the carrier medium. This pressurized flow of vaporized solvent induces a linear-toroidal flow in the carrier medium about the rise conduit. This linear-toroidal flow results in intimate contact between the carrier medium and the solvent, and extraction of the solute into the solvent. The vaporized solvent is then condensed after it exits the carrier medium and is returned to the distillation chamber of the vessel for continuity. In the preferred embodiment of the present invention, the condenser includes a number of rotary spheres and the condensed solvent falls from the condenser into the carrier medium directly above the conduit riser, for further intimate contact between the solvent and carrier medium and enhanced extraction.

The present method and apparatus thus provides a new concept to maximize efficiency and minimize the time required for solute extraction due to the combined linear-toroidal flow induced in the carrier medium. The present apparatus and method can be adopted for use in either a batch wise or continuous basis. The method and apparatus have utility for many types of chemical extraction processes, including by way of non-limiting example: the cleansing of organic contaminants from polluted aqueous samples; the reclamation of contaminants from process waste streams for reuse, such as in precious metal reclamation; the concentration of pollutants for analysis and consequent environmental monitoring; the removal and reclamation of radioactive wastes from contaminated fluids; reclamation of used solvent; purification of foods or drugs; and medical applications such as purification of blood and urinalysis.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
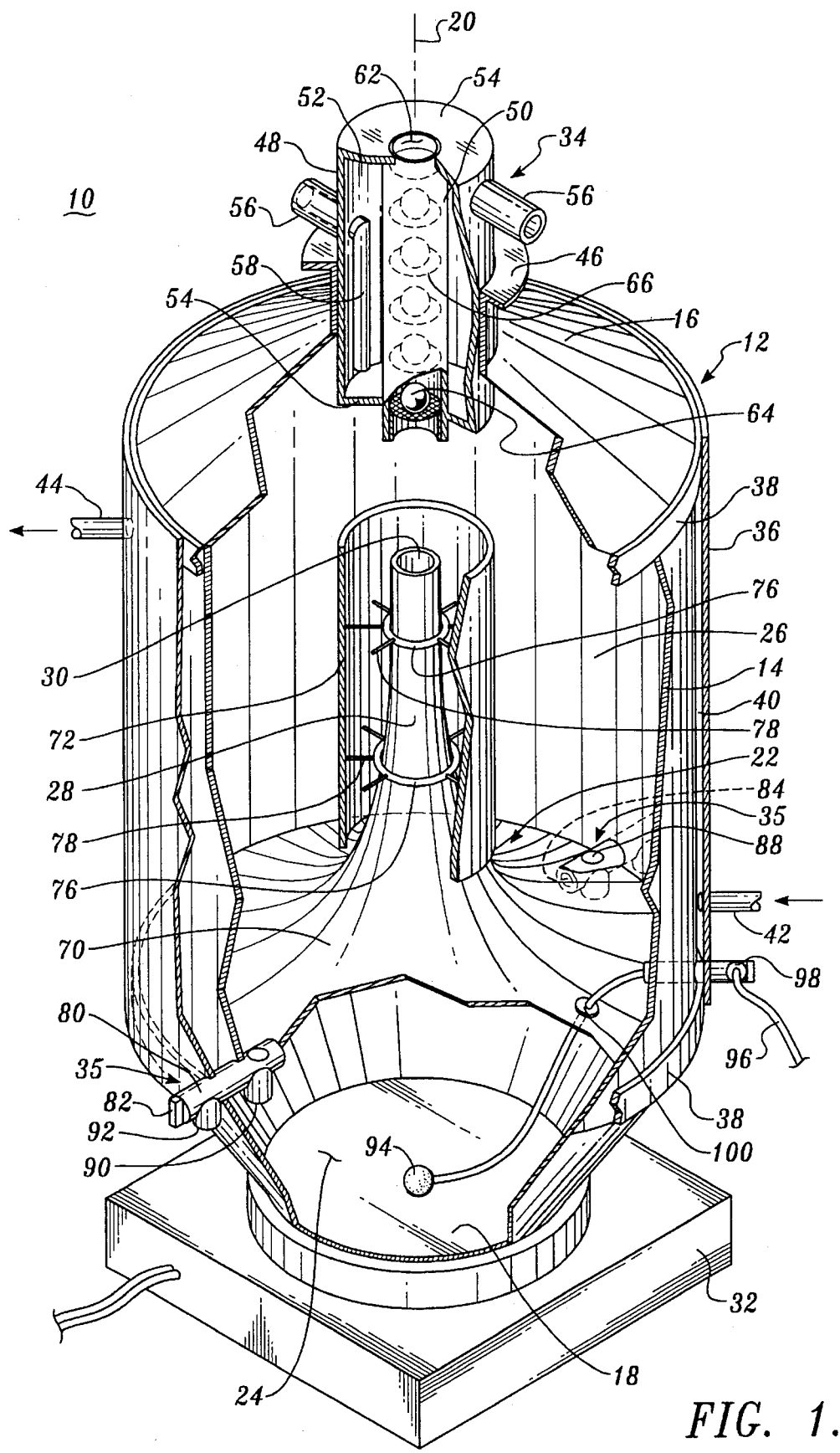
FIG. 1 provides an isometric view of a continuous extraction apparatus of the present invention, with a portion of the outer cooling jacket, vessel wall, condenser, and internal convergent baffle broken away to expose the interior construction of the apparatus.
Figure 2:
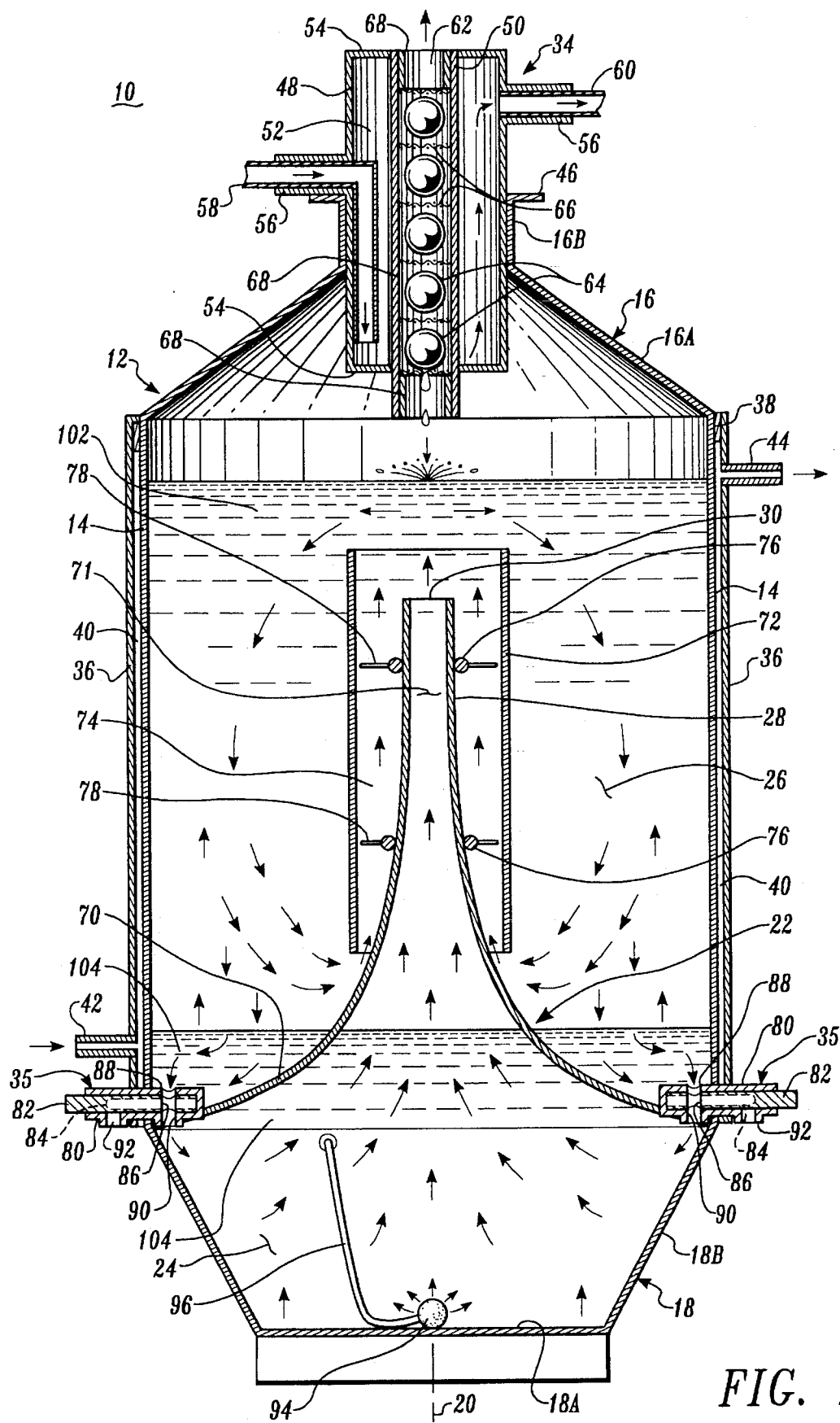
FIG. 2 provides a cross-sectional view of the apparatus of FIG. 1 taken along the longitudinal axis of the apparatus, illustrated in use for continuously extracting solute from a liquid feed stream using a liquid solvent that is more dense than the feed stream.

A preferred embodiment of a continuous extraction apparatus (10) constructed in accordance with the present invention and referred to by the inventor as the A.M.D.G. extraction apparatus, is shown in FIGS. 1 and 2. The apparatus (10) is formed from a vessel (12) having a cylindrical side wall (14) having an upper end sealed by a top wall (16) and a lower end sealed by a bottom wall (18). The cylindrical vessel defines a longitudinal axis (20).

The vessel (12) includes an internal inverted funnel-shaped convergent baffle (22) secured around its outer periphery to the interior of the side wall (14) proximate the bottom wall (18). The baffle (22) separates the interior of the vessel into a lower distillation chamber (24) defined by the underside of the baffle (22) and the bottom wall (18), and an upper extraction chamber (26) defined by the upper side of the baffle (22), the interior of the side wall (14) and the top wall (16). The convergent baffle (22) forms a conduit riser (28) that projects upwardly into the extraction chamber (26). The upper terminus of the conduit riser (28) defines a vaporized solvent port (30) that places the distillation chamber (24) in direct fluid flow communication with the extraction chamber (26).

In use, heat is applied by a heat source (32) to the bottom of the distillation chamber (24), causing solvent contained therein to vaporize and rise through the conduit riser (28) into the extraction chamber (26). A carried medium, which may be either a liquid or solid, containing the solute to be extracted is placed within the extraction chamber (26). The rising solvent vapor passes through the carrier medium as it exits the vaporized solvent port (30). This vapor pressurized flow induces a linear-toroidal flow in the carrier medium about the conduit riser (28) which is most pronounced with a liquid carrier medium, and which maximizes continuous contact between the vaporized solvent and the carrier medium above the conduit riser (28). Vaporized solvent then condenses on the interior of the top wall (16) and within a condenser (34) provided centrally in the top wall (16). All condensed solvent then falls back down into the carrier medium within the extraction chamber (26) for further extraction. All condensed solvent is returned to the distillation chamber (24) through valves (35) which can be configured to permit fluid flow through the baffle (22).

Construction of the vessel (12) shall now be described in further detail, still referring to FIGS. 1 and 2. The vessel can be constructed from glass, stainless steel, or other chemically resistant material. The side wall (14) is shielded by a cylindrical cooling jacket (36) that is sealed at its upper and lower ends to the upper and lower ends of the side wall (14) by annular spacer rings (38). An annular space (40) is defined between the cooling jacket (36) and side wall (14). The cooling jacket (36) is provided with an inlet fitting (42) affixed near the lower spacer ring (38) and a diametrically opposed outlet fitting (44) affixed near the upper spacer ring (38). The inlet fitting (42) and outlet fitting (44) each include an interior passage opening into the annual space (26). A cooling fluid such as water, ethylene glycol or air can be supplied to the inlet fitting (42), which flows through the annular space (40) to the outlet fitting (44), to absorb heat from the side wall (14) and thereby aid condensation of the vaporized solvent within the extraction chamber (26). The bottom wall (18) of the vessel (12) has a concave configuration, having a flat base portion (18A) and an outwardly expanding wall portion (18B). The base portion (18A) may alternately be round or tapered. The top wall (16) has a generally convex configuration, including an inwardly tapering wall portion (16A) terminating at its center in a straight walled tubular neck portion (16B). A radially extending annular flange (46) is formed about the upper terminus of the neck portion (16B).

The rotating spheres-condenser (34) is of double-wall construction and is slidably received within the neck portion (16B) of the top wall (16) to permit access to the interior of the vessel (12). The rotating spheres-condenser (34) includes a cylindrical outer wall (48) and a coaxial inner wall (50) having a length greater than the outer wall (48), so that the inner wall (50) extends from the top of the outer wall (48) to a point below the bottom of the outer wall (48). An annular space (52) is defined between the outer wall (48) and the inner wall (50). The annular space (52) is sealed at each end by top and bottom annular cover plates (54).

The rotating spheres-condenser (34) is constructed to enable a cooling fluid such as water, ethylene glycol, air or a refrigerant to flow therethrough during use. The outer wall (48) is provided with radially oriented and diametrically opposed tubular inlet and outlet fittings (56) that define inlet and outlet ports through the outer wall (48). An inlet tube (58) is received within the inlet fitting (56) and angles downwardly toward the bottom of the interior of the annular space (52). Coolant supplied from a coolant supply flows through the inlet tube (58) through the annular space (52), exiting from an outlet tube (60) fitted to the outlet fitting (56), which is disposed proximate the top of the condenser (34).

The inner wall (50) of the condenser (34) defines a central passage (62) having a longitudinal axis that is aligned with the longitudinal axis (20) of the vessel (12). The central passage (62) is provided with a structure providing a large surface area to cause solvent vapor to condense within the central passage (62) as it flows through the central passage and is cooled by the coolant flowing through the annular space (52). While various conventional condenser structures could be utilized, in the preferred embodiment the condenser (34) includes a plurality of glass, metallic, or ceramic spheres (64) that are maintained in spaced relationship within the central passage (62) by transverse screens (66). The screens (66) and spheres (64) are retained within the central passage (62) by retainer rings (68) stacked between the screens and at each end of the central passage (62). As pressurized vaporized solvent flows through the central passage (62), the spheres (64) rotate and bounce between the containing screens (66) and inner wall (50), creating a large and dynamic aggregate surface area for condensate to form and relieve pressure. Condensed solvent then drips downwardly from the central passage (62) back into the extraction chamber (26) above the conduit riser (28) for further extraction, as shown in FIG. 2.

As previously mentioned, the convergent baffle (22) has an inverted funnel configuration. The convergent baffle (22) has a flared lower skirt portion (70) that is sealed around its outer perimeter to the inside of the side wall (14) of the vessel (12), proximate the point of juncture with the top of the wall portion (18B) of the bottom wall (18). The convergent baffle (22) tapers inwardly and upwardly, so that its upper portion defines the tubular conduit riser (28). The convergent nozzle or conduit riser (28) projects upwardly into the extraction chamber (26), approximately three-quarters of the height of the side wall (14) of the vessel (12). The conduit riser (28) defines an internal conduit or flow passage (71) that communicates with the extraction chamber (26) via the vaporized solvent port (30) defined at the apex of the conduit riser (28). The longitudinal axis of the tubular conduit riser (28) is aligned with the longitudinal axis (20) of the vessel (12). When viewed in cross-section as in FIG. 2, the convergent nozzle or conduit riser on either side of the central axis (20) defines a shape substantiating one-half of a parabola, i.e., a semi-parabolic shape. The diameter of the tubular conduit riser (28) at its upper extremity is substantially smaller than the internal diameter of the side wall (14) of the vessel (12). In the preferred embodiment illustrated, the conduit riser (28) at its upper terminus has a diameter equal to approximately ten percent (10%) that of the vessel interior diameter or ratio of 1:9.

As shall be described in more detail subsequently, shear flow of vaporized solvent through the carrier medium after the vapors exit the vaporized solvent port (30) of the conduit riser (28) induces a linear-toroidal flow in the carrier medium. It is believed that the velocity of flow in this toroidal motion can be accelerated and volume of fluid flowing in this path can be regulated by including an optional accelerator guide (72), as illustrated. The accelerator guide (72) has a tubular configuration and a larger diameter than that of the conduit riser (28). The accelerator guide (72) is positioned coaxially over the conduit riser (28) and defines an annular passage (74) therebetween. The accelerator guide (72) extends upwardly above the upper terminus of the conduit riser (28), as shown in FIG. 2. In order to maintain the accelerator guide (72) in this position, the apparatus includes spacers consisting of annular rings (76) that rest on the conduit riser (28). Spacers spines (78) project radially outward from the rings (76) and are secured at their ends to the interior of the accelerator guide (72). Thus, the rings (76) and spine (78) maintain the vertical orientation and coaxial centering of the accelerator guide (72), while not substantially inhibiting flow of fluid through the annular passage (74).

The apparatus (10) most preferably includes a passage enabling condensed solvent vapor from the condenser (34) to return to the distillation chamber (24). This recycling provision enables the level of solute extracted into the solvent to be increased. Conventional recycling means such as a tube run from an outlet of the condenser to the distillation could be utilized. However, it is preferable to enhance extraction efficiency by allowing condensed solvent to pass back into the extraction medium, travel downwardly through the extraction chamber (26) while extracting solute and back into the distillation chamber (24) for continuity. One or more apertures can be formed in the baffle (22) to provide for this solvent return. However, in order to control the ability of solvent to pass through the baffle, it is preferable to use a valve that allows the condensed solvent return passage to be opened and closed.

In the preferred embodiment of the apparatus (10) illustrated in FIGS. 1 and 2, solvent return is provided by one or more valves (35). In the preferred embodiment, two diametrically opposed valves (35) are utilized. Each valve (35) has a valve body (80) that passes through the vessel cooling jacket (36) and side wall (14) just above the juncture of the skirt portion (70) of the baffle (22) with the side wall (14). An aperture formed in the baffle receives the inner end of the valve body (80) and is sealed thereto. The valve body (80) houses a valve rotor (82) including an internal passage (84) extending longitudinally inwardly from the inner end of the valve rotor (82). A radial passage (86) is formed crosswise through the valve rotor (82) and intersects the internal passage (84). The valve rotor (82) can be positioned so that the radial passage (86) aligns with a first port (88) formed in the valve body (80) that opens into the extraction chamber (26) and a second port (90) that is formed in the valve body (80) and opens into the distillation chamber (24). A second radial passage intersects the radial outward end of the internal passage (84) within the valve rotor (82) and can be positioned to align with a third port (92) formed in the valve body (80) that opens to the exterior of the vessel (12).

The valve rotor (82) can be rotatably positioned within the valve body (80) to a selected one of three orientations. In a first "closed" position, flow through the valve (35) is prevented, with each of the ports (88, 90 and 92) being closed by the valve rotor (82). In a second, "in-use" position, the valve rotor (82) is positioned such that the radial passage (86) aligns with the first port (88) and second port (90), so that flow is provided between the extraction chamber (26) and the distillation chamber (24). This in-use position provides for return of condensed solvent from the extraction chamber (26) to the distillation chamber (24). In a third "drain" position, the first and second ports (88 and 90) are blocked while the second radial passage is aligned with the third port (92), such that flow is permitted from the radially inner end of the internal passage (84) through the valve (35) and exiting the third port (92). This allows for drainage of fluid from the vessel (12) after use or sampling of fluid to determine progress of the extraction during operation.

The apparatus (10) also includes the heat source (32) for vaporizing a solvent in the distillation chamber (24). As illustrated, the heat source (32) consists of an electric heating pad or coil. However, it should be readily apparent that alternate heat sources would be equally suitable, such as a gas burner or steam jet or heated air for applying heat to the distillation chamber (24) at a controlled rate. The rate of heat application is adjusted by boiling point temperature during use to control the rate of solvent vaporization, and thus the rate of extraction.

The apparatus (10) may also optionally include a gas sparger formed from porous centered ceramic or metal that is supplied with an inert gas from a gas supply line (96) that is passed through the walls (14, 36) of the vessel (12) and baffle (22) by fittings (98) and (100), respectively, as shown in FIG. 1. The purpose of the sparger (94) is to disburse the gas stream into separate bubbles, and it should be readily apparent that alternate bubbler structures could be utilized such as an elongate robe having multiple perforations. The sparger (94) can be utilized to introduce an inert, ambient temperature gas stream to enhance the volatilization of the solvent and carrying of the solvent up the conduit riser (28). Alternately, the gas supplied to sparger (94) can be heated either to supplement or replace the heat source (32) for vaporization of the solvent. Finally, rather than using an inert gas, a gas capable of extracting solute from the carrier medium can be selected.

Operation of the apparatus (10) shall now be described with reference to FIG. 2. FIG. 2 illustrates the apparatus (10) being used to continuously extract solute from a liquid carrier medium (102) using a liquid solvent (104) that is more dense i.e., heavier, than the liquid carrier medium (102). For example, for extracting organic solutes from an aqueous carrier medium (102), an example of a suitable high-density and non-polar solvent (104) is methylene chloride, which requires operation of the apparatus (10) at the boiling point temperature of 43° C. It should be readily apparent to those of ordinary skill that other solvents or solvent blends can be selected depending on the nature of the carrier medium and the solutes to be removed. As illustrated in FIG. 2, the liquid carrier medium (102) and solvent (104) are first introduced to the interior of the vessel (12) by removing the condenser (34) and adding the liquids through the neck portion (16B) of the top wall (16). The valves (35) are configured to the in-use position, so that liquid flow is permitted between the extraction chamber (26) and the distillation chamber (24). The solvent (104) is first added to a level approximately as shown in FIG. 2, such that the solvent (104) fills the distillation chamber (24). Additional solvent is added to fill under the skirt portion (70) of the baffle (22) and the bottom portion of the extraction chamber (26) above the skirt portion (70) of the baffle (22). The less dense liquid carrier medium (102) is then poured into the vessel (12) to a height extending above the top of the conduit riser (28) and, if utilized, the accelerator guide (72). Heat is then applied to the distillation chamber (24) until the solvent (104) begins to boil and put off vapors.

The volatile solvent rises upwardly through the conduit riser (28), exiting through the vaporized solvent port (30) into the liquid carrier medium (102). As the vapors rise upwardly through the carrier medium, some of the solvent is cooled by the liquid carrier medium (102) and condenses, while the remaining vaporized solvent continues to rise upwardly. Due to this contact between the solvent (104) and the liquid carrier medium (102), solute is continuously extracted from the liquid carrier medium into the solvent. The drop in pressure resulting as the solvent vapors exit the vaporized solvent port (30) of the conduit riser (28) and the shear flow of the vapor and liquid carrier medium cause the liquid carrier medium (102) to be drawn upwardly with the rising vapors. This induces a linear-toroidal motion within the liquid carrier medium (102) centered about the conduit riser (28). The central axis of the toroidal path of motion is aligned with the longitudinal axis (20) of the apparatus (10).

The combination of the linear motion of the rising solvent vapor and the linear-toroidal motion of the liquid carrier medium (102) assures that fresh liquid carrier medium (102) is continually introduced to the rising solvent to maximize extraction. The solvent vapors are either condensed upon contact with the liquid carrier medium (102), which is cooled by the cooling jacket (36), condenses on the inside of the top wall (16) of the vessel, or condenses within the cooled condenser (34). The solvent condensing on the top wall (16) flows back downwardly from the top wall (16) into the liquid carrier medium (102), flowing downwardly under the force of gravity and enhancing the toroidal flow within the liquid carrier medium (102). Solvent condensed in the condenser (34) drops down into the liquid carrier medium (102) above the conduit riser (28), further increasing the contact of solvent and carrier medium in this zone of maximum extraction defined above and around the top of the convergent nozzle or conduit riser (28). The solvent then also flows downwardly extracting through the liquid carrier medium (102) to return to the distillation chamber (24) through the passages provided through the valves (35) for continuity of the process.

The accelerator guide (72) is believed to accelerate the toroidal flow within the liquid carrier medium (102) by creating a shear flow siphon-like effect through the annular passage (74) defined between the accelerator guide (72) and the conduit riser (28). The accelerator guide (72) also serves to guide the fluid flow path so that, while turbulent mixing occurs above the conduit riser (28), substantially laminar flow in a circular motion (defined by a cross-section of the toroidal flow pattern) occurs on the sides of the conduit riser (28) and also serves as a method to regulate fluid-flow volumes to maximize extraction.

Figure 3:
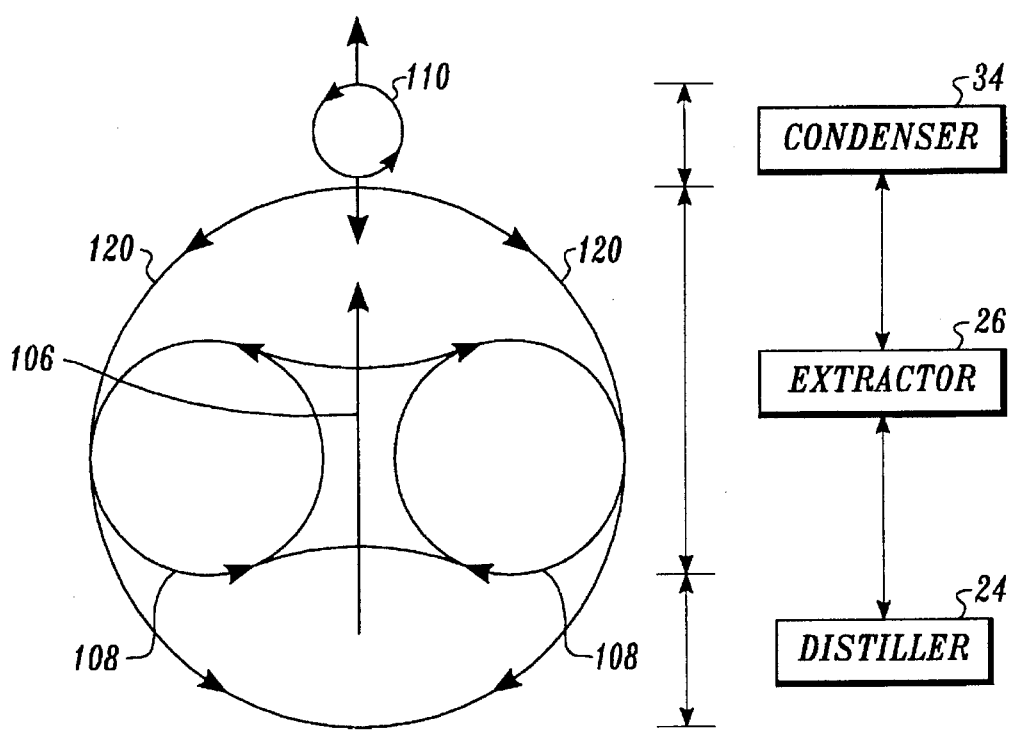
FIG. 3 provides a schematic diagram representation of the continuous fluid-flow of liquid in the apparatus when operated as shown in FIG. 2.

FIG. 3 provides a schematic diagram of the fluid-flow pattern within the apparatus (10). Volatilized solvent flows as indicated by arrow (106) upwardly from the distillation chamber (24) through the conduit riser (28) into the upper portion of the extraction chamber (26). The linear-toroidal motion of the liquid carrier medium (102) about the conduit riser (28) is illustrated by circular paths (108). Solvent vapors are condensed within a condenser (34) as represented by circular path (110). Condensed solvents return down along the side of the extraction chamber (26) to the distillation chamber (24) as represented by circular path (120).

Figure 4:
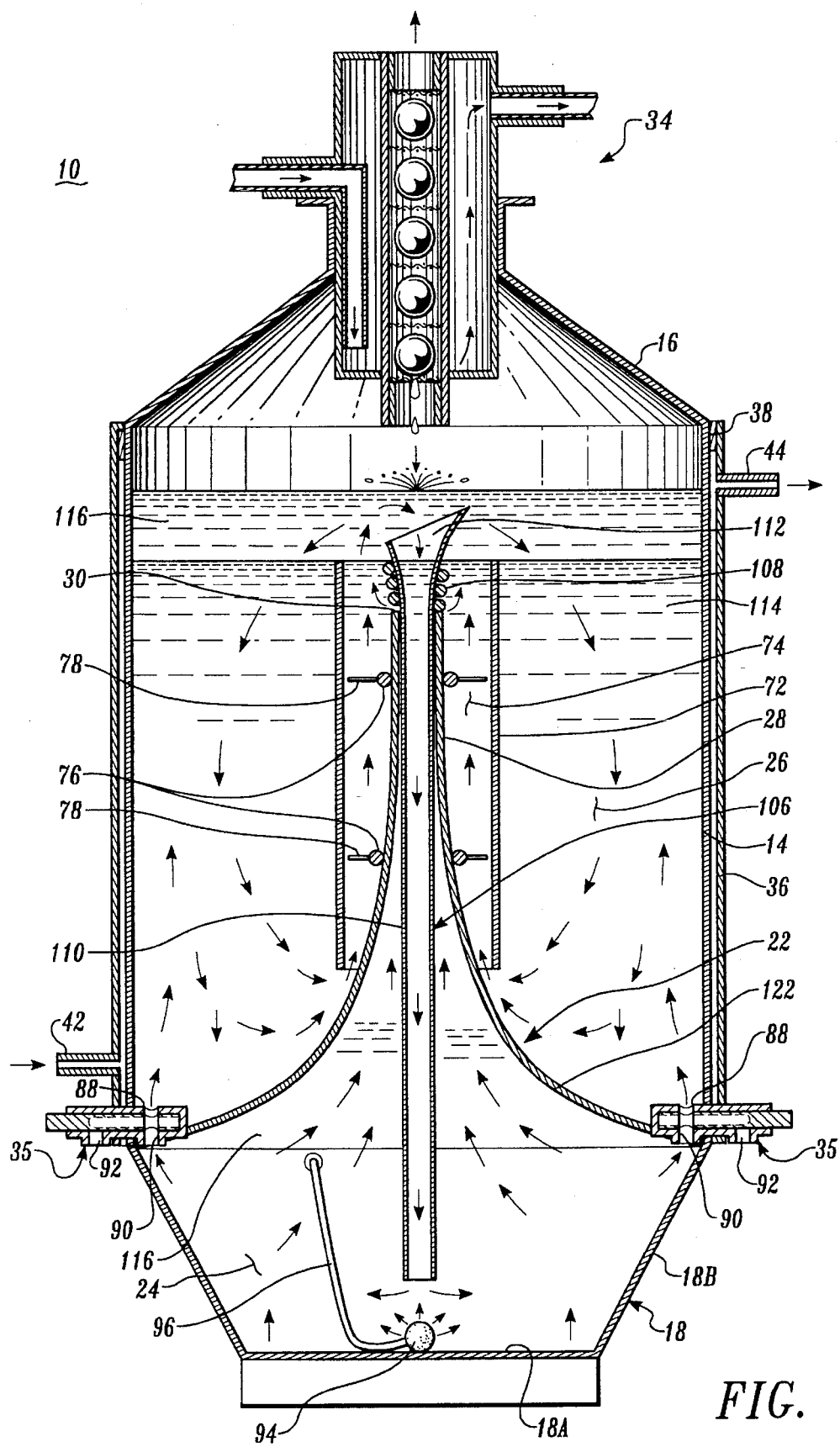
FIG. 4 provides a cross-sectional view of an alternate embodiment of a continuous extraction apparatus taken along the longitudinal axis of the apparatus, illustrated in use for continuous extraction of a solute from a feed stream using a solvent that is less dense than the feed stream.

FIG. 4 shows an alternate embodiment of a continuous extraction apparatus (10) that has been adapted for use with one or more solvents that are lighter, i.e., less dense, than the liquid carrier medium. A suitable example of a low-density non-polar solvent for use with aqueous carrier mediums is ethyl ether, which requires operation of the apparatus at the boiling point temperature of 35° C. The apparatus (10) in FIG. 4 is identical to that previously described and illustrated in FIG. 2, except for the provision of a venturi-siphon tube (106) inserted within the conduit riser (28) and a coil spring (108) connecting those structures. The venturi-siphon tube (106) has a generally tubular configuration, and has a straight-walled body portion (110) and a flared head portion (112). The body portion (110) has an outside diameter that is slightly less than the inside diameter of the vaporized solvent port (30) formed at the top of the conduit riser (28). The end of the body portion (110) remote from the head portion (112) is cut or otherwise formed on a diagonal. The opposite end of the body portion (110) is flared to form the enlarged head portion (112). The head portion (112) has an outside diameter that is greater than the inside diameter of the vaporized solvent port (30) of the conduit riser (28). The head portion (112) has a generally divergent funnel-shaped configuration, except that it also is end cut on a diagonal.

The body portion (110) of the venturi-siphon tube (106) is slidably received within the conduit riser (28), and is biased downwardly under its own weight until the head portion (112) contacts the top of the conduit riser (28). In this lowered position, the top of the head portion (1 12) extends above of the top of the accelerator guide (72). The bottom of the body portion (110) of the venturi-siphon tube (106) extends into the distillation chamber (24), terminating at a distance spaced above the base portion (18A) of the bottom wall (18). As shown in FIG. 4, the longitudinal axis of the venturi-siphon tube (106) is aligned with the longitudinal axis of the conduit riser (28).

The venturi-siphon tube (106) is further biased downwardly to the lowered position shown in FIG. 4 by a coil spring (108) that is slid over the body portion (110) of the venturi-siphon tube (106) and embraces the head portion (112). The upper most ring of the coil spring (108) is secured to the head portion (112), such as by being received within a groove formed around the exterior of the head portion (112). The opposite lower end of the coil spring (108) is received over the end of the conduit riser (28), and is secured thereto such as by being received within a groove formed about the top of the conduit riser (28). As previously noted, the coil spring (108) serves to bias the venturi-siphon tube (106) downwardly. In this downward position, the head portion (112) seals against the conduit riser (28), to prevent flow of fluid between the venturi-siphon tube (106) and the conduit riser (28).

If sufficient upward pressure is exerted on the venturi-siphon tube (106) to overcome the bias force of the spring (108), the venturi-siphon tube will travel upwardly to a raised position, in which a gap is exposed between the venturi-siphon tube (106) and the conduit riser (28), to permit fluid flow therebetween. This upward pressure is provided by boiling solvent in the distillation chamber (24) during use, as shall be described subsequently.

Operation of the apparatus (10) including the venturi-siphon tube (106) shall now be explained with reference to FIGS. 4 and 5. As noted above, the apparatus (10) including the venturi-siphon tube (106) is constructed to permit the apparatus (10) to be used for extraction of solute from a liquid carrier medium (114), such as water, using a solvent (116) that is lighter than the carrier medium (114). Initially, the light solvent (116) is poured into the distillation chamber (24) of the vessel, with the valves (35) in the closed configuration. The distillation chamber (24) and the interior of the conduit riser (28) are filled with the solvent. The liquid carrier medium (114) is then poured into the extraction chamber (26) to fill the chamber to a height higher than the top of the conduit riser (28) but lower than the top of the venturi-siphon tube (106). In the preferred embodiment shown in FIG. 4, the carrier medium (114) is added to a height even with the top of the accelerator guide (72). Additional light solvent (116) is then poured into the vessel to a height sufficient to cover the top of the venturi-siphon tube (106). Now top and bottom layers of solvents are connected by the venturi-siphon tube, which acts to place the top and bottom layers in equilibrium by providing for solvent return from the extraction chamber (26) to the distillation chamber (24). Because the valves (35) are closed, and the head of the venturi-siphon tube (106) is biased downwardly to seal the conduit riser (28), the carrier medium (114) is not able to flow downwardly into the distillation chamber before heat is applied to the apparatus (10).

Heat is then applied to the distillation chamber (24) to begin vaporization of the solvent (116). The valves (35) are then optionally opened to permit flow between the distillation chamber (24) and extraction chamber (26). It is believed that the vapor pressure of the boiling solvent (116) will cause the solvent (116) to flow upwardly through the valves (35), rather than the liquid carrier medium (114) flowing downwardly through the valves (35) because of vapor pressure. The upward flow of solvent (116) through the valves (35) is represented by circular path (118) in FIG. 5. To replace the solvent (116) leaving the distillation chamber (24) in this fashion, solvent (116) will be drawn downwardly through the venturi-siphon tube (106) back into the distillation chamber (24), as represented by arrow (120) in FIG. 5. Simultaneously, when there is sufficient vapor pressure in the distillation chamber (24) to overcome the bias of the coil spring (108), the venturi-siphon tube (106) is displaced upwardly to the raised position to permit fluid flow between the conduit riser (28) and the venturi-siphon tube (106). The vaporized solvent is thus able to flow upwardly and exit the distillation chamber in this fashion, as represented by arrow (122) in FIG. 5. The vaporized solvent thus passes through the carrier medium (114) just above the riser conduit (28).

Figure 5:
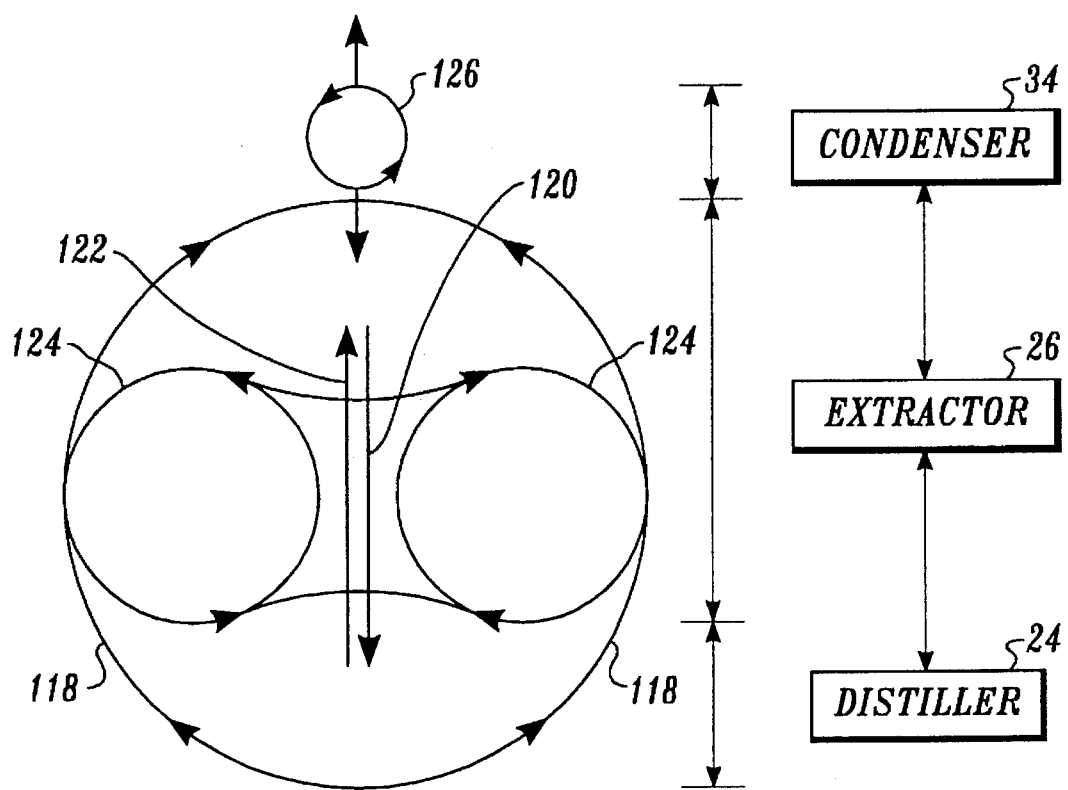
FIG. 5 provides a schematic diagram representation of the continuous fluid-flow of liquid in the apparatus when operated as shown in FIG. 4.

The flow of the vaporized solvent again induces linear-toroidal flow in the liquid carrier medium (114), as represented by flow paths (124) in FIG. 5. Solvent vapors condense in the condenser (34), as represented by circular flow path (126) in FIG. 5, or on the internal surfaces of the top wall (16) of the vessel (12), and return to the upper layer of the solvent (116) to be drawn back downwardly through the venturi-siphon tube (106) to return to the distillation chamber (24) for continuity of solvent supply.

While the preferred embodiment of the invention has been illustrated and described, it will be appreciated that various changes can be made therein without departing from the spirit and scope of the invention. For example, while a tubular conduit riser (28) has been illustrated and described above, it should be readily apparent to those of ordinary skill in the art that the conduit could be otherwise configured such as having a rectangular rather than circular cross-sectional profile to create different motions and flow paths. Further, the conduit riser could be curved to induce differing flow patterns. Additionally, rather than having a single central conduit riser (28), a plurality of spaced conduit risers could be formed in the baffle (22), with a zone of maximum extraction being created above each conduit riser, with the shape of the zone determined by the riser configuration. This may be particularly appropriate for larger versions of the apparatus (10), wherein a separate toroidal flow cell or other shaped flow cell would be created around each conduit riser.

The operation of the apparatus (10) has been described above in terms of utilizing both a liquid solvent and a liquid carrier medium. However, it should be readily apparent to those of ordinary skill in the art based on the disclosure contained herein that solids may instead be utilized in both of these phases. For example, activated carbon or a chelating agent such as a zeolite can be placed within the distillation chamber such that the solvent circulating through the apparatus would pass through this solid extraction medium on a continuous basis. The solute would then be transferred from the solvent to the solid extraction medium to aid in the removal of the solute. This may particularly be desirable for the removal of radioactive isotopes.

Likewise, in addition to use of liquid carrier mediums containing the solute, it should be apparent that a solid carrier medium to be stripped of solute can be employed. Thus, for example, contaminated soil can be suspended in a liquid medium filling the extraction chamber. Likewise, solid carrier medium can be placed in the extraction chamber, and the solvent would then circulate through the packed solid to remove the solute. However, it will also be appreciated that if a packed solid rather than a suspension or liquid is utilized, toroidal flow within the extraction chamber (26) may be inhibited but the linear flow extraction will be more predominate for the same effect.

Another use of the apparatus (10) entails placing a solid extraction medium, such as activated charcoal, in the distillation chamber (24). A liquid carrier medium containing a solute to be extracted is placed in the extraction chamber (26), and the valves (35) are opened to allow the liquid carrier medium to flow into the distillation chamber (24). Air is then introduced into the distillation chamber via the bubbler, and carries liquid carrier medium up the conduit riser (28). This induces a linear-toroidal flow in the liquid, and causes it to circulate from the extraction chamber (26), into the distillation chamber (24), flowing through the solid extraction medium contained therein for extraction of the solute. The liquid then returns to the extraction chamber (26) via the conduit riser (28), continuously recirculating. This method is believed to be useful for blood purification.

It should also be readily apparent to those of skill in the art that the apparatus (10) could be connected as part of an automated integrated analysis or solute recovery system. Solvent and carrier medium would be introduced to the apparatus automatically on a batchwise basis, and samples would be automatically drawn and analyzed to track the progress of the extraction.

In view of the above alterations and variations to the preferred embodiments of the invention, as well as others that will be readily apparent to those of skill in the art based on the disclosure contained herein, it is intended that the scope of Letters Patent granted hereon be limited only by the definitions contained in the following claims.

The embodiments of the invention in which an exclusive property or privilege is claimed are defined as follows:

1. An apparatus for continuously extracting a solute from a carrier medium using a volatile solvent, comprising:

a vessel having an interior defining a lower end and an upper end;

a convergent baffle disposed across the interior of the vessel between the lower end and the upper end of the vessel, thereby bifurcating the vessel into a distillation chamber below the baffle for containing a volatile solvent and an extraction chamber above the baffle for containing the carrier medium, wherein the baffle is contoured to define a convergent conduit riser projecting upwardly from the distillation chamber into the extraction chamber and terminating in a vaporized solvent port placing the distillation chamber in fluid flow communication with the extraction chamber, and wherein the baffle has a flared lower skirt portion sealed about its edges to the interior of the vessel;

a vapor condenser mounted on the upper end of the vessel and in fluid flow communication with the extraction chamber; and means for returning condensed solvent from the condenser to the distillation chamber.

2. The apparatus of claim 1, further comprising means for vaporizing the solvent in the distillation chamber of the vessel.

3. The apparatus of claim 2, wherein the means for vaporizing comprises means for applying heat to the distillation chamber.

4. The apparatus of claim 2, wherein the means for vaporizing comprises a gas sparger disposed in the distillation chamber and connected in fluid flow communication to a gas supply.

5. The apparatus of claim 1, wherein the conduit riser is centrally disposed within the extraction chamber.

6. The apparatus of claim 5, wherein the vessel has a cylindrical configuration and the conduit riser has a tubular configuration, the cylindrical vessel and conduit riser defining a common longitudinal axis.

7. The apparatus of claim 1, wherein the conduit riser has a tubular configuration.

8. The apparatus of claim 1, wherein the means for returning condensed solvent comprises at least one liquid solvent return port defined in the baffle proximate the distillation chamber to place the extraction chamber in further fluid flow communication with the distillation chamber.

9. The apparatus of claim 8, further comprising at least one three-way valve mounted through a wall of the vessel adjacent the baffle, the three-way valve having a first port opening outside of the vessel, a second port opening into the extraction chamber, and a third port opening through the baffle into the distillation chamber, the valve being positionable between a closed configuration, wherein fluid flow through the valve is not permitted, a drain configuration, wherein fluid flow from the extraction chamber through the valve to the exterior of the vessel is permitted, and an in-use position, wherein fluid flow is permitted from the extraction chamber through the valve to the distillation chamber for liquid solvent return.

10. The apparatus of claim 1, wherein the conduit riser has a tubular configuration and defines a longitudinal axis, further comprising a tubular accelerator guide disposed coaxially over the tubular conduit riser and supported by spacers, the accelerator guide defining a longitudinal axis aligned with longitudinal axis of the conduit riser, an annular fluid flow passage being defined between the accelerator guide and the conduit riser.

11. The apparatus of claim 1, further comprising:

a venturi-siphon tube having an enlarged head portion, the venturi-siphon tube being slidably inserted into the conduit riser, the venturi-siphon tube being positioned between a lower position in which the head portion of the venturi-siphon tube seals against the vaporized solvent port of the conduit riser, thereby preventing flow between the venturi-siphon tube and the conduit riser, and an upper position, wherein the head portion of the venturi-siphon tube is spaced from the vaporized solvent port of the conduit riser and fluid flow is permitted between the venturi-siphon tube and the conduit riser; and spring means connected to the conduit riser and the venturi-siphon tube for biasing the venturi-siphon tube downwardly to the lower position.

12. The apparatus of claim 1, wherein the vapor condenser includes a plurality of spheres past which the vapor flows, thereby causing the spheres to rotate.

* * * * *